US008731272B2

(12) United States Patent
Adie et al.

(10) Patent No.: US 8,731,272 B2
(45) Date of Patent: May 20, 2014

(54) COMPUTATIONAL ADAPTIVE OPTICS FOR INTERFEROMETRIC SYNTHETIC APERTURE MICROSCOPY AND OTHER INTERFEROMETRIC IMAGING

(75) Inventors: Steven G. Adie, Urbana, IL (US); Paul Scott Carney, Champaign, IL (US); Stephen A. Boppart, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 13/996,838

(22) PCT Filed: Jan. 16, 2012

(86) PCT No.: PCT/US2012/021426
§ 371 (c)(1),
(2), (4) Date: Oct. 29, 2013

(87) PCT Pub. No.: WO2012/102887
PCT Pub. Date: Aug. 2, 2012

(65) Prior Publication Data
US 2014/0050382 A1    Feb. 20, 2014

Related U.S. Application Data

(60) Provisional application No. 61/435,569, filed on Jan. 24, 2011.

(51) Int. Cl.
*G06K 9/00* (2006.01)
(52) U.S. Cl.
USPC .......................................................... 382/131
(58) Field of Classification Search
CPC ................... G06T 2207/10101; G06T 7/0057; G01B 2290/70; G02B 21/0056
USPC ........................................................... 382/131
See application file for complete search history.

(56) References Cited

U.S. PATENT DOCUMENTS 6,930,781 B2 *  8/2005  Agladze et al. ............... 356/456
7,054,062 B2 *  5/2006  Engelhardt et al. ........... 359/389
(Continued)

OTHER PUBLICATIONS

Brynmor J. Davis, Simon C. Schlachter, Daniel L. Marks, Tyler S. Ralston, Stephen A. Boppart, and P. Scott Carney, "Nonparaxial vector-field modeling of optical coherence tomography and interferometric synthetic aperture microscopy," JOSA A, vol. 24, Issue 9, pp. 2527-2542 (2007).*

(Continued)

*Primary Examiner* — Utpal Shah
(74) *Attorney, Agent, or Firm* — Sunstein Kann Murphy & Timbers LLP (57) ABSTRACT

Methods for correcting for aberrations in the image or three-dimensional reconstruction of a sampled region obtained by broadband interferometry. The sampled region is illuminated with a broadband beam of light, and light returned from the sample is detected, along with a reference beam, in order to derive an interference signal for pixels of a volume spanned by wavenumber and axes transverse to the beam propagation direction. An optimization procedure is performed with respect to a specified criterion so as to obtain an aberration-corrected image of at least one plane of the sampled region, either in a plane-specific manner or in a space-invariant manner throughout the sampled region. A filter function, which may be derived from the interference signal attendant to irradiating a sparsely distributed plurality of point scatterers, or otherwise, corrects for a detected aberrated point spread function. Methods of the present invention may be used for aberration correction in reading information from an optical data storage medium.

18 Claims, 5 Drawing Sheets

(56) References Cited

U.S. PATENT DOCUMENTS

| | | | | |
|---|---|---|---|---|
| 7,324,216 B2* | 1/2008 | Hill | | 356/512 |
| 7,355,722 B2* | 4/2008 | Hill | | 356/511 |
| 7,394,549 B2* | 7/2008 | Hendriks et al. | | 356/497 |
| 7,602,501 B2 | 10/2009 | Ralston et al. | | 356/497 |
| 7,643,155 B2 | 1/2010 | Marks et al. | | 356/497 |
| 7,708,402 B2* | 5/2010 | Ribak | | 351/159.02 |
| 8,201,943 B2* | 6/2012 | Hammer et al. | | 351/206 |
| 8,451,452 B2* | 5/2013 | Podoleanu et al. | | 356/479 |
| 8,462,349 B1* | 6/2013 | Rhoadarmer et al. | | 356/491 |
| 2004/0227950 A1 | 11/2004 | Hill | | 356/450 |
| 2006/0033933 A1* | 2/2006 | Feierabend et al. | | 356/512 |
| 2006/0077395 A1* | 4/2006 | Chan et al. | | 356/497 |
| 2009/0221920 A1* | 9/2009 | Boppart et al. | | 600/476 |
| 2012/0002165 A1* | 1/2012 | Saito | | 351/206 |
| 2013/0107268 A1* | 5/2013 | Boccara et al. | | 356/450 |

OTHER PUBLICATIONS

Booth et al., "Predictive aberration correction for multilayer optical data storage," *Appl. Phys. Lett.*, vol. 88, No. 3, pp. 031109-1-031109-3 (Jan. 2006).

Colomb et al., "Numerical parametric lens for shifting, magnification, and complete aberration compensation in digital holographic microscopy," *J Opt. Soc. Am. A*, vol. 23, No. 12, pp. 3177-3190 (Dec. 2006).

De Nicola et al., "Recovering correct phase information in multiwavelength digital holographic microscopy by compensation for chromatic aberrations," *Opt. Lett.*, vol. 30, No. 20, pp. 2706-2708 (Oct. 2005).

Hermann et al., "Adaptive-optics ultrahigh-resolution optical coherence tomography," *Opt. Lett.*, vol. 29, No. 18, pp. 2142-2144 (Sep. 2004).

Miccio et al., "Direct full compensation of the aberrations in quantitative phase microscopy of thin objects by a single digital hologram," *Appl. Phys. Lett.*, vol. 90, No. 4, pp. 041104-1-041104-3 (Jan. 2007).

Kam et al., "Computational adaptive optics for live three-dimensional biological imaging," *Proc. Natl. Acad. Sci. U.S.A.*, vol. 98, No. 7, pp. 3790-3795 (Mar. 2001).

Vellekoop et al., "Focusing coherent light through opaque strongly scattering media," *Opt. Lett.*, vol. 32, No. 16, pp. 2309-2311 (Aug. 2007).

Wright et al., "Adaptive optics for enhanced signal in CARS microscopy," *Opt. Exp.*, vol. 15, No. 26, pp. 18209-18219 (Dec. 2007).

Zhang et al., "High-speed volumetric imaging of cone photoreceptors with adaptive optics spectral-domain optical coherence tomography," *Opt. Exp.*, vol. 14, No. 10, pp. 4380-4394 (May 2006).

Park, Tae Wook, Authorized officer Korean Intellectual Property Office, International Search Report—Application No. PCT/US2012/021426, mailing date of Aug. 7, 2012, along with the Written Opinion of the International Searching Authority (6 pages).

* cited by examiner

COMPUTATIONAL ADAPTIVE OPTICS FOR INTERFEROMETRIC SYNTHETIC APERTURE MICROSCOPY AND OTHER INTERFEROMETRIC IMAGING

This invention was made with Government support under Grant NIBIB, R01EB012479 awarded by the National Institutes of Health, and under Grants CBET 08-52658 and CBET 10-33906 awarded by the National Science Foundation. The Government has certain rights in the invention.

The present application claims the priority of U.S. Provisional Patent Application Ser. No. 61/435,569, filed Jan. 24, 2011, which is incorporated herein by reference.

TECHNICAL FIELD

The present invention relates to methods and apparatus for computational correction of tomographic images, reconstructed by inverse scattering, for effects of an intervening optical path.

BACKGROUND ART

Aberrations in optical microscopy reduce image resolution and contrast, and can limit imaging depth when focusing into biological samples, for example. Static correction of aberrations may be achieved through appropriate lens design, but this does not offer the flexibility of simultaneously correcting aberrations for all imaging depths, nor the adaptability to correct for sample-specific aberrations for high-quality tomographic optical imaging.

It has proven possible to improved optical image contrast and resolution considerably by applying adaptive-optics (AO) methods, however these methods have been limited to microscopic techniques based either on intensity (non-interferometric) imaging (as taught, for example, by Wright, et al., "*Adaptive optics for enhanced signal in CARS microscopy,*" *Opt. Express*, vol. 15, pp. 18209-19 (2007), or on optical coherence tomography (OCT), as taught, for example, by Hermann, et al., "*Adaptive-optics ultrahigh-resolution optical coherence tomography,*" *Opt. Lett.*, vol. 29, pp. 2142-44 (2004), and Zhang, et al., "*High-speed volumetric imaging of cone photoreceptors with adaptive optics spectral-domain optical coherence tomography,*" *Opt. Express*, vol. 14, pp. 4380-94 (2006), all of which papers are incorporated herein by reference. Booth et al., *Predictive aberration correction for multilayer optical data storage*, *Appl. Phys. Lett.*, vol. 88, 031109 (2006), incorporated herein by reference, suggests the application of beam-correcting AO techniques to three-dimensional optical data storage devices. All of the foregoing methods operate by correcting a beam used in deriving an image.

The light microscope is a fundamental tool underpinning many historic developments in medicine and biology. The confocal laser scanning microscope utilizes a pinhole to reject light from out-of-focus planes to achieve superior optical sectioning, and enable 3D imaging (tomography). Modern optical microscopy, capitalizing on the development of the laser, has provided new capabilities to image thick specimens, and peer deeper into scattering tissues. Additionally, two-photon microscopy advantageously provides for imaging depths of hundreds of micrometers in biological tissue.

The development of OCT has enabled in vivo tomography with a relatively large imaging depth (1-3 mm) in scattering tissues, as discussed, for example, in Fercher et al., *Optical coherence tomography—principles and applications, Rep. Prog. Phys.*, vol. 66, pp. 239-303 (2003), which is incorporated herein by reference. OCT has achieved widespread clinical use in ophthalmology, and applications in cardiology, oncology, gastroenterology, and dermatology are currently undergoing translation from the research lab into clinical practice. By incorporating near-infrared broadband sources, OCT can provide micrometer-scale axial resolution. However, transverse resolution, which is inversely proportional the objective lens numerical aperture (NA), is typically low, resulting in an asymmetric three-dimensional (3D) point-spread function (PSF). The use of higher NA optics has enabled cellular resolution, as discussed in Boppart et al., *In vivo cellular optical coherence tomography imaging, Nat. Med.*, vol. 4, pp. 861-65 (1998), incorporated herein by reference, however the use of high-NA optics results in significant reduction of the depth-of-field.

A solution to the problem of reduced depth of field has been that of combining tomograms obtained at different focal depths, as taught by Rolland et al., *Gabor-based fusion technique for Optical Coherence Microscopy, Opt. Exp.*, vol. 18, 3632-42 (2010), incorporated herein by reference, however the price of acquiring and combining multiple tomograms is increased acquisition time and the complication of mechanical scanning. Another solution is that of Interferometric synthetic aperture microscopy (ISAM), taught in Ralston et al., *Interferometric synthetic aperture microscopy, Nat. Phys.*, vol. 3, pp. 129-34 (2007), incorporated herein by reference, a computed imaging technique based on a solution to the inverse scattering problem for OCT, enables object reconstruction with spatially invariant focal-plane resolution at all depths, without having to scan the focus. The foundations of interferometric synthetic aperture microscopy (ISAM) are laid out in U.S. Pat. No. 7,602,501 (issued Oct. 13, 2009) and U.S. Pat. No. 7,643,155 (issued Jan. 5, 2010), and in references cited in each of the foregoing patents, all of which patents and references are incorporated herein by reference. ISAM provides for the scattering potential of a sample to be reconstructed with spatially invariant resolution even outside a region of focus, using modalities such as optical coherence tomography (OCT). Thus, deep regions may be imaged with high transverse resolution even with optics of high numerical aperture (NA), where the depth of focus is short.

A remaining problem, however, even when shortened depth of focus at high-NA is effectively remediated through the inverse scattering techniques of ISAM, is that of aberrations introduced by the optical system and by characteristics of the sample itself.

Aberration correction has been demonstrated in digital holographic microscopy (DHM), as described, for example, by Colomb et al., *Numerical parametric lens for shifting, magnification, and complete aberration compensation in digital holographic microscopy, J. Opt. Soc. Am. A*, vol. 23, 3177-90 (2006), and in De Nicola et al., *Recovering correct phase information in multiwavelength digital holographic microscopy by compensation for chromatic aberrations, Opt. Lett.*, vol. 30, 2706-08 (2005), both of which of are incorporated herein by reference. Computational correction of aberrations in DHM, however, has only been demonstrated for non-scattering (or, "thin") samples using discrete-wavelength optical sources, as by Miccio, et al., *Direct full compensation of the aberrations in quantitative phase microscopy of thin objects by a single digital hologram, Appl. Phys. Lett.*, vol. 90, 041104 (2007). DHM's susceptibility to cross-talk from adjacent regions of a sample and to out-of-plane scattering in turbid samples has rendered it ineffective for tomography of bulk biological tissue.

A method of Kam et al., *Computational adaptive optics for live three-dimensional biological imaging, Proc. Natl. Acad.*

Sci. USA, vol. 98, pp. 3790-95 (2001), uses space-variant deconvolution to compensate sample-specific aberrations, and is suited for imaging fluorescence from relatively weakly scattering biological samples. Demonstrated with an image of a fluorescent bead under an oil droplet, this method utilized a separate measurement of the sample using Nomarski differential interference microscopy to map its refractive index. This map was then used to perform 3D optical ray tracing to compute the magnitude of the aberrated PSF used for deconvolution.

None of the methods taught in the prior art, however, has been applicable to interferometric tomographic techniques wherein spectral information is pertinent to data analysis.

SUMMARY OF EMBODIMENTS OF THE INVENTION

In accordance with embodiments of the invention, apparatus and methods are provided for correcting for aberrations in the image or 3D reconstruction of a sample region obtained by broadband interferometry. Methods in accordance with preferred embodiments, have steps of:
  a. illuminating a sample with a broadband source of light characterized by a propagation axis;
  b. acquiring an interference signal between light scattered from the sample and a reference beam derived from the broadband source, the signal acquired at a plurality of pixels in a volume spanned by wavenumber and by axes transverse to the beam propagation axis; and
  c. applying an optimization procedure with respect to a specified criterion so as to obtain an aberration-corrected image of at least one plane of the sampled region.

In accordance with other embodiments of the present invention, the optimization procedure may entail minimizing a difference between a detected aberrated point spread function and a specified system point spread function. An additional step may be performed of applying a filter function to correct an image based on a detected aberrated point spread function.

In further embodiments of the invention, the optimization procedure may include extremizing a specified parameter subject to a specified model, and the specified parameter may be a Rényi entropy. The optimization procedure may also include resampling based on at least one of sharpness of point-like scatterers and specified imaging metrics applied to aberration-corrected image data.

In accordance with alternate embodiments of the present invention, the sample is irradiated in conjunction with irradiating a sparsely distributed plurality of point scatterers, and steps are performed of:
  superposing scattered radiation from the plurality of point scatterers with a reference beam derived from the source of the beam of radiation to provide a calibrating interference signal;
  acquiring the calibrating interference signal as a function of wavelength; and
  deriving the filter function on a basis of a detected aberrated point spread function relative to a desired system point spread function determined from the distributed plurality of point scatterers.

More particularly, the sparsely distributed plurality of point scatterers may be (but need not be) included in the sampled region. The point scatterers may be injected in the sample region, or may be included in a phantom distinct from the sampled region. If a phantom is used, the phantom may be irradiated in temporal succession to the sample under substantially identical optical conditions as the sampled region.

Methods in accordance with other embodiments of the present invention may further comprise solving an inverse scattering problem based upon the interference signal subject to the filter function to infer a three-dimensional structure of the sampled region. The step of applying the filter function may derive a plurality of aberration-corrected images in each of a plurality of en face planes.

In accordance with yet other embodiments of the present invention, the step of acquiring may include superposition of the scattered radiation with a reference beam onto a plurality of detectors.

In accordance with alternate embodiments of the invention, a non-transitory computer readable medium for use on a computer system for correcting aberrations in the image or 3D reconstruction of a sampled region obtained by broadband interferometry, the non-transitory computer readable medium having computer readable program code thereon, that includes:
  a. a computer code module for receiving an interference signal between light scattered from the sampled region as illuminated by a broadband source and a reference beam derived from the broadband source, the signal acquired at a plurality of pixels in a volume spanned by wavenumber and by axes transverse to the beam propagation axis; and
  b. a computer code module for applying an optimization procedure with respect to a specified criterion so as to obtain an aberration-corrected image of at least one plane of the sampled region.

In other embodiments of the invention, the non-transitory computer readable medium may also have computer code modules:
  c. for deriving a filter function accounting for a detected aberrated point spread function relative to a desired system point spread function; and
  d. for applying the filter function to obtain an aberration-corrected image of at least one plane of the sampled region.

In accordance with yet further embodiments of the present invention, a method is provided for reading data from an optical information storage medium. The method has steps of:
  a. irradiating a region of the optical information storage medium with a beam of light characterized by a broadband spectrum;
  b. superposing radiation returned from a plurality of features disposed within the optical information storage medium with a reference beam derived from the source of the beam of radiation to provide an interference signal;
  c. acquiring the interference signal as a function of wavelength;
  d. applying an optimization procedure with respect to a specified criterion so as to obtain an aberration-corrected image of at least one plane of the region of the optical information storage medium; and
  e. outputting a data value based on the optical characteristic of the one feature within the region of the optical storage medium.

In other embodiments of the invention, there may also be steps of:
  applying to the interference signal a filter function accounting for an aberrated point spread function relative to a desired system point spread function to obtain an aberration-corrected image of a specified plane of the region; and outputting a data value based on an optical characteristic of a feature within the specified plane of the region.

Under certain conditions, the methods described herein may be applied for post-imaging aberration correction for sample-specific aberrations.

BRIEF DESCRIPTION OF THE DRAWINGS

Under certain conditions The foregoing features of the invention will be more readily understood by reference to the following detailed description, taken with reference to the accompanying drawings, in which:

FIG. 2(a) shows successive en face planes of an imaged silicone phantom with suspended microparticles, while FIG. 2(b) show the same planes subsequent to aberration correction, and FIG. 2(c) is an ISAM reconstruction of the aberration corrected images in accordance with an embodiment of the present invention;

FIG. 3(a) plots resolution vs. depth for aberration corrected OCT and ISAM, while FIG. 3(b) compares the signal to noise ratio of ISAM reconstructions with and without the astigmatism producing cylindrical lens, in accordance with embodiments of the present invention;

DESCRIPTION OF SPECIFIC EMBODIMENTS OF THE INVENTION

Definitions

The term "image" shall refer to any multidimensional representation, whether in tangible or otherwise perceptible form, or otherwise, whereby a value of some characteristic (amplitude, phase, etc.) is associated with each of a plurality of locations corresponding to dimensional coordinates of an object in physical space, though not necessarily mapped one-to-one thereonto. Thus, for example, the graphic display of the spatial distribution of some field, either scalar or vectorial, such as brightness or color, constitutes an image. So, also, does an array of numbers, such as a 3D holographic dataset, in a computer memory or holographic medium. Similarly, "imaging" refers to the rendering of a stated physical characteristic in terms of one or more images.

The terms "object" and "sample" shall refer, interchangeably, to a tangible, non-transitory physical object capable of being rendered as an image.

The term "extremizing" shall refer either to maximizing or to minimizing, as the context requires.

The term "broadband," or, equivalently, herein, "low-coherence," refers to a source of irradiation for which $\Delta k/k_0$ is at least 1%, with $k_0$ denoting the central wavenumber of the spectrum illuminating the sample, while $\Delta k$ denotes the range of illuminating wavenumbers, or a source having a coherence length shorter than 100 µm. A broadband source typically emits a continuous range of wavelengths, either simultaneously or during the course of a wavelength sweep. It is to be understood that, within the scope of the present invention, the wavelength of the source may be swept in time, and that concurrent broadband illumination and post-dispersion detection is employed in preferred embodiments of the invention.

Optical terms used herein, such as "point spread function" (PSF), "pupil function," etc., have their ordinary meanings in Fourier optics, as defined and used in Goodman, *Introduction to Fourier Optics*, $2^d$ edition, (1996), which is incorporated herein by reference.

In accordance with embodiments of the present invention, methods are provided for correcting aberrations in a tomogram itself rather than the beam of a broadband optical interferometry system. Unlike any prior method of compensating for aberrations, methods of the present invention correct aberration artifacts in the complex PSF of a broadband interferometric system, and, in particular, are suitable for tomography of scattering tissue. Prior methods have not been applicable to interferometric tomographic techniques wherein the interferogram is spectrally post-dispersed.

Methods of computational adaptive optics (CAO) in accordance with the present invention are advantageously applicable to all broadband interferometric imaging geometries, and to biological as well as non-biological imaging applications, all of which are within the scope of the present invention.

When utilized in conjunction with Interferometric Synthetic Aperture Microscopy (ISAM) in particular, CAO as described herein enables object reconstruction with ideal focal plane resolution at all depths. Insofar as an OCT tomogram is a record of both amplitude and phase of the backscattered field, OCT can be considered a relative of digital holographic microscopy (DHM). As in digital holography, the acquired signal is an invertible transformation of the optical field, and this physical fact is employed, in accordance with embodiments of the present invention, as a basis for compensating for beam aberrations. However, in spectral-domain OCT and ISAM, in contradistinction to the case of DHM, a broadband signal is collected.

Figure 1:
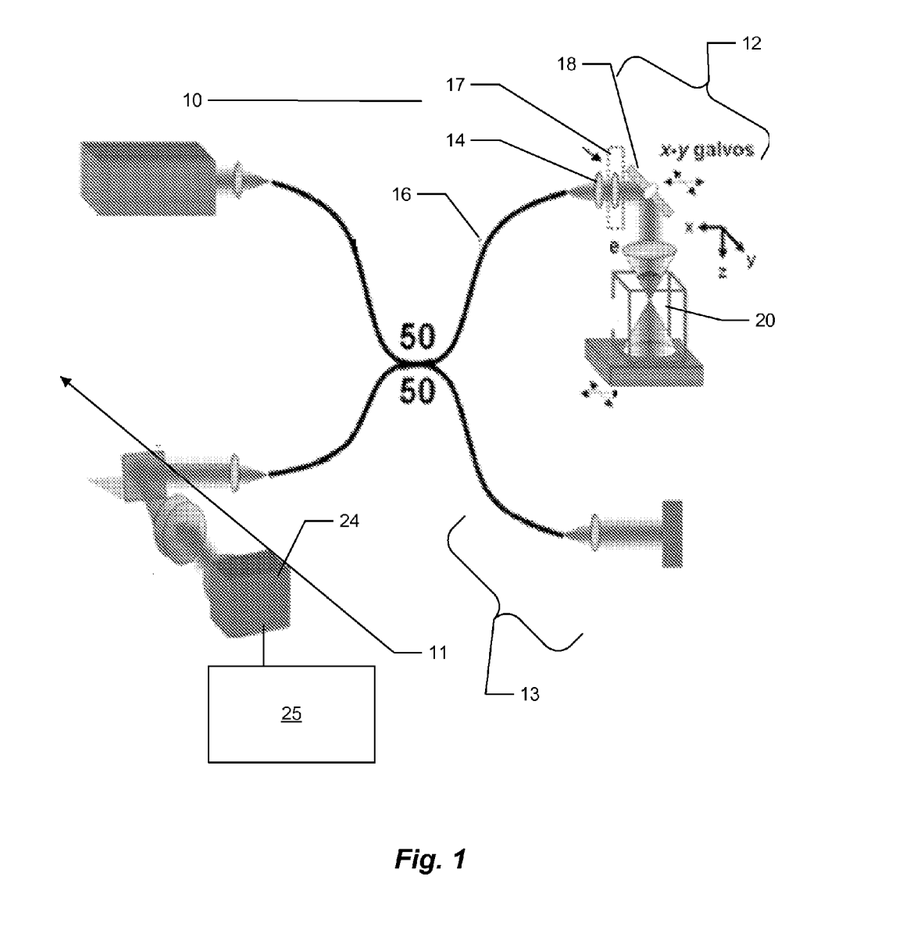
FIG. 1 depicts a spectral-domain OCT system for practice of methods of the present invention.

A spectral-domain (SD)-OCT system, with which methods of the present invention may be advantageously employed, is now described with reference to FIG. 1. Reconstruction of a scattering field is simplified by the simultaneous (therefore phase-stable) recording of the wavelength-dependent interferometric signal at each scan coordinate. This may be accomplished in the following manner: Light from an illumination source 10, preferably a low-coherence source such as a mode-locked titanium:sapphire laser or a superluminescent diode, is split, as by means of a fiber-based beam splitter 11, into sample- (12) and reference- (13) arms. In one embodiment, sample arm 12 provides a beam of nominal NA of 0.1, although methods in accordance with the present invention may be applied without limitation to particular ranges of numerical aperture. A preferable design for reducing aberrations utilizes identical doublets with 19-mm focal length for a collimator 14 and objective 15 lenses. The mode field diameter of fiber 16 is thus imaged with a magnification of unity, resulting in focal plane resolution of 5.6 µm and Rayleigh range of 30 µm. In the embodiment of FIG. 1, astigmatism is introduced by means of a plano-convex cylindrical lens 17 with 1000-mm focal length directly after collimator 14 in order to provide a highly astigmatic beam, for purposes that will become evident in the discussion below. Beam 17 may be steered using an x-y galvanometer pair 18 with mirror apertures of 10 mm.

Combined return beams from a sampled region 20 (which may be a portion, or the entirety of a sample) and from reference mirror 21 are post-dispersed by grating 22 onto line-scan camera 24 providing a spectral interferometric signal to processor 25. Typically, three-dimensional datasets, in the space of frequency (or wavenumber) and transverse-plane axes, are acquired for 2048×1000×600 pixels (k×x×y) with isotropic spatial sampling in the x- and y-dimensions of 1 μm. Data acquisition rates are typically about 10 kHz and with an exposure time of 40 μs, however the scope of the invention is not limited by any of the foregoing typical conditions. Typical frame rates of about 9 Hz, allow time between frames to re-arm the frame trigger.

A feature distinguishing ISAM from DHM is that, in ISAM, sample 20 may be scanned with a focused beam, as in the case of a confocal microscope, thereby advantageously rejecting cross-talk from adjacent regions and out-of-plane scattering in turbid samples. However, object reconstruction must instead account for spatially-dependent phase noise from random fluctuations of interferometric optical path length or from beam scanning errors, and these additional requirements are advantageously addressed by teachings of the present invention, and now discussed in detail, and are advantageously applicable to all manner of broadband interferometric imaging geometries, and for non-biological imaging applications.

Example

Figure 2:
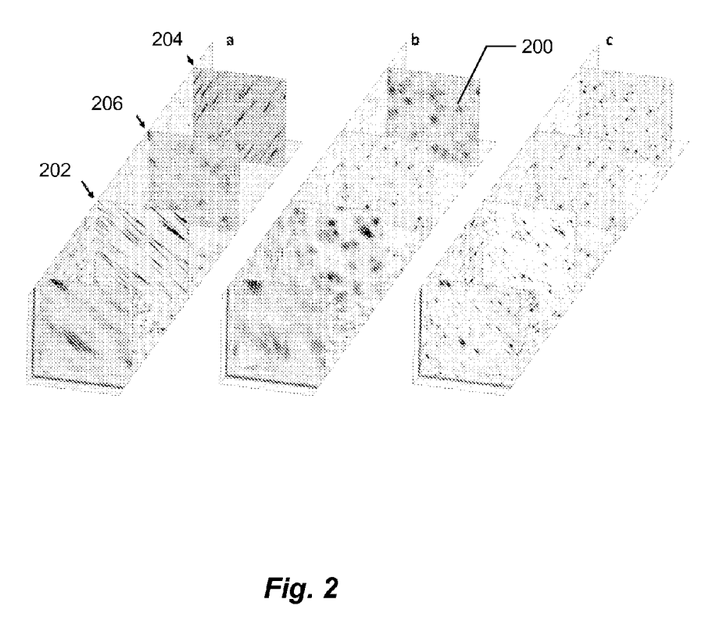

Prior to description of methods of adaptive optics in accordance with embodiments of the present invention, results of application of such methods are discussed with reference to FIG. 2, which demonstrates aberration correction of 3D, broadband, interferometric data acquired from a silicone phantom with sub-resolution titanium dioxide ($TiO_2$) microparticles 200. Data were acquired with a highly astigmatic beam, generated with a cylindrical lense as described with reference to FIG. 1. The sparse phantom of $TiO_2$ microparticles dispersed in silicone provides a convenient measure of the depth-dependent 3D PSF of the system.

In practice, point-like scatterers 200, which serve a purpose analogous to that of "guide stars" in astronomical AO, may naturally exist within sampled region 20. In cases where sample 20 does not inherently possess point-like scatterers, the sample may be injected or seeded with scatterers, or, alternatively, and also within the scope of the present invention, the sample may be placed adjacent to an external 'test sample', or phantom, of point scatterers, which is to say that the phantom may coincide with the sample, or may be placed above, below, or beside the sample. The test sample may be located immediately above or below the sample of interest, such that the 'test sample' and the sample under test may be imaged simultaneously. The test sample can be used to correct the wavefront distortions or aberrations induced by the sample of interest, in a manner analogous to the manner in which 'guide stars' are used in adaptive optics for terrestrial astronomy to correct for atmospheric turbulence.

After spectral-domain OCT processing, as described, for example in Fercher (2003) and Ralston (2007), the presence of two line foci 202 and 204 associated with astigmatism can be seen in the series of en face (x-y) planes depicted in each of FIGS. 2(a)-2(c), with the so-called plane of least confusion 206 approximately midway between them. After CAO aberration correction, the plane of least confusion 206 is restored as the nominal astigmatism-free focal plane, and the line foci are transformed into circular symmetric transverse PSFs, free of astigmatism, as can be seen in FIG. 2(b). Subsequent ISAM resampling results in a 3D reconstruction of the phantom with the defocus removed, as shown in FIG. 2(c). After CAO and ISAM, the 3D complex object scattering potential is reconstructed with spatially invariant resolution at all depths.

Figure 3A:
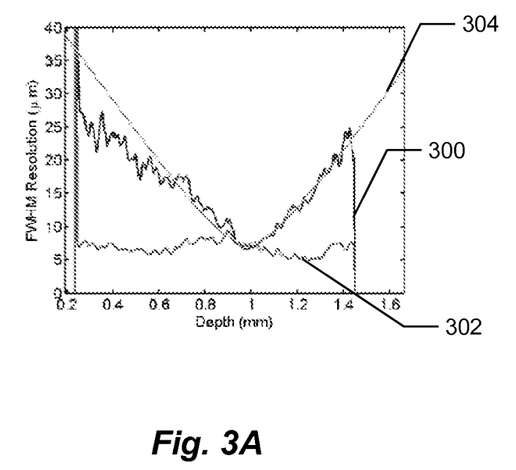

FIG. 3(a) shows the resolution (full-width at half-maximum (FWHM), in micrometers) for aberration corrected OCT (300) along with a Gaussian theory best fit curve 304, and the substantially spatially-invariant aberration-corrected ISAM 302. Resolution, as plotted in FIG. 3(a), is calculated using techniques described in Ralston (2007).

Figure 3B:
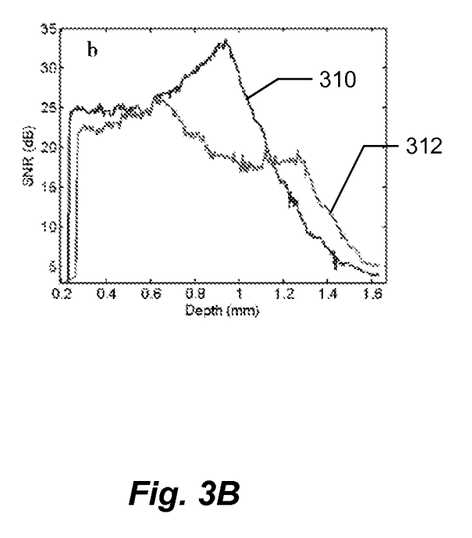

Whereas aberrations are traditionally viewed as detrimental in optical microscopy, CAO may advantageously provide the ability to exploit benefits available when imaging with aberrated beams. An example of such a benefit is shown in FIG. 3(b), which compares the signal-to-noise ratio (SNR) of ISAM reconstructions with (310), and without (312), the astigmatism-producing cylindrical lens added to the sample arm optics. ISAM reconstructions after CAO demonstrate the advantage of a more uniform depth-dependent signal, thereby reducing the dynamic range required to represent the signal. At a given depth deep within the sample (e.g., z=1.4 mm), this is also seen to increase SNR. The change in depth-dependent SNR can be attributed to the presence of two, axially-separated line foci, effectively forming two (partial) confocal gates within the sample. This result is particularly advantageous in the case of high-NA OCT, where the steep roll-off in signal strength with distance from focus demands data acquisition with a larger dynamic range.

Data Processing and Phase Noise Correction

In accordance with embodiments of the present invention, aberrations of a virtual pupil are corrected, as now described in detail on the basis of principles of Fourier optics. A virtual pupil is the aperture function of the objective lens (exit) pupil as computed from a measurement of the optical field at a plane other than the objective lens pupil. The nominal focal plane provides a convenient plane to make this measurement of the optical field as the objective lens pupil is obtained by Fourier transform. If the optical field is measured at another plane, then the measurement may be numerically propagated to the focus and then Fourier transformed using standard principles of Fourier optics. In preferred embodiments, aberrations of the virtual pupil are corrected using polynomial phase functions such as the Zernike polynomials, or via the segmented pupil approaches previously utilized in hardware-based wavefront conjugation techniques, as taught, for example, by Vellekoop, et al., *Exploiting disorder for perfect focusing*, Nat. Photon., vol. 4, pp. 320-22, (2010), Vellekoop, et al., *Focusing coherent light through opaque strongly scattering media*, Opt. Lett., vol. 32, pp. 2309-11, (2007), and Ji, et al., Nat. Methods, vol. 7, pp. 141-47, (2009), all of which are incorporated by reference herein.

Figures 4A, 4B:
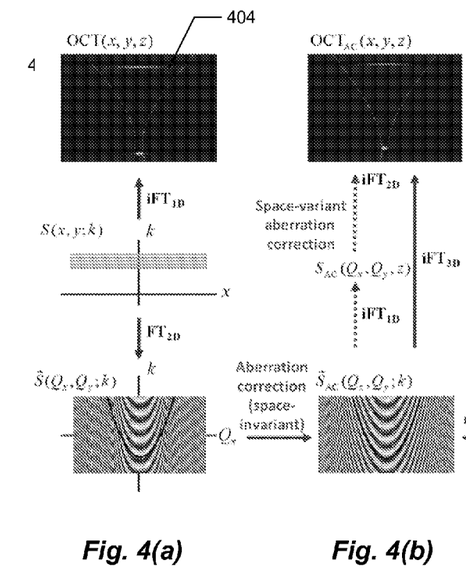
FIGS. 4(a)-4(c) depict processing steps for computational aberration correction in accordance with an embodiment of the present invention.
Figure 4C:
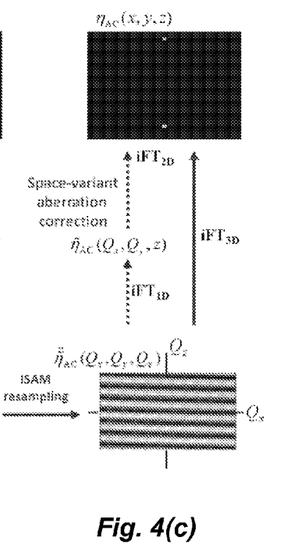

Data processing and aberration correction for OCT and ISAM is now described in brief, with reference to FIGS. 4(a)-4(c), where an overview is shown of data processing and the relationship between raw data, intermediate signals resulting in the aberration-corrected (AC) OCT tomogram, and ISAM reconstruction, The dashed curves in the OCT and $OCT_{AC}$ images (in the top panels of FIGS. 4(a) and 4(b)) represent the incident optical beam with respect to the sample that contains two scatterers, 402 and 404, the first in focus and the second out of focus. Frequency domain images (bottom row) show the phase profile associated with the out-of-focus scatterer. FT and iFT denote the Fourier transform and inverse Fourier transform respectively. Bolded arrows denote processing steps for space-invariant aberration correction, while the dashed arrows indicate the steps enabling space-variant aberration correction (i.e. at specific en face depths).

Raw data are first corrected for fixed and material dispersion, as taught in Marks et al., *Autofocus algorithm for dispersion correction in optical coherence tomography*, Appl. Opt., vol. 42, pp. 3038-46 (2003), which is incorporated herein by reference, yielding S(x,y;k), (for transverse coordinates x and y, and wavenumber k) referred to, now, as "the signal," depicted in the central panel of FIG. 4(a). Taking the inverse Fourier transform yields OCT(x,y,z), in the top panel of FIG. 4(a). The focus depth is then shifted to "DC" (z=0) by applying a circular shift to the signal, following the procedure described in Ralston et al., *Real-time Interferometric Synthetic Aperture Microscopy*, Opt. Exp., vol. 16, pp. 2555-69 (2008), incorporated herein by reference. After a 3D Fourier transform, yielding $\tilde{S}(Q_x,Q_y;k)$ in the lower panel of FIG. 4(a), a 3D aberration correction filter, described below, is applied to the signal, yielding the lower panel of FIG. 4(b). The aberration-corrected OCT tomogram (in the top panel of FIG. 4(b)) is then obtained by taking a 3D inverse Fourier transform, and the ISAM reconstruction is obtained via ISAM resampling (from the lower panel of FIG. 4(b) to the lower panel of FIG. 4(c)) followed by a 3D inverse Fourier transform, yielding the top panel of FIG. 4(c). ISAM sampling is described in detail in U.S. Pat. No. 7,643,155 and in references cited therein, moreover, cubic B-spline interpolation may be used after, optionally, first upsampling the data by a factor of two to increase interpolation accuracy.

A phase correction algorithm may be applied to remove axial and transverse phase noise resulting from interferometer axial pathlength fluctuations, or from beam scanning instabilities. Axial phase noise typically dominates, and may be corrected through the use of a phase reference coverslip placed in contact with the sample, as discussed by Ralston (2007). To correct transverse shifts, the complex cross-correlation between frames (depth-averaged in the transverse frequency domain) may be calculated, and the transverse frequency-domain phase ramp (transverse group delay in the space domain) between frames may be compensated.

A principle of computational adaptive optics is the correction of aberrations in a virtual (or computed) pupil plane rather than the physical pupil plane of the objective lens. From Fourier optics, the (transverse) optical field distribution at the beam focus, g(x,y,z=0;k), at optical wavenumber k, is related to the objective lens pupil function by the Fourier transform. Therefore, from a measurement of the optical field at the nominal focus, i.e. g(x,y,0;k), a corresponding (virtual) pupil function can be computed via the transverse Fourier transform.

In order to correct aberrations, the complex system PSF can be measured using a sparse phantom consisting of sub-resolution scatterers 200 (shown in FIG. 2), such as titanium oxide scatterers. However, due to the double-pass imaging geometry of FIG. 1 (i.e., since the beam enters and exits sample 20 along the same path), the system PSF, h(x,y,z;k)∝g²(x,y,z;k), is a product of the (identical) illumination and collection beams. According to the convolution theorem, the transverse Fourier transform of the complex system PSF is the convolution of the virtual pupil functions discussed above. A measurement of the OCT PSF provides a measure of the square of the optical field.

In analogy with hardware-based AO, and in accordance with customary usage in optics, pupil aberrations are typically expressed using Zernike polynomials, although without limitation to the scope of the claimed invention. An aberration-correction filter is computed as the (transverse) convolution of these aberrated (virtual) pupil functions. This aberration-correction filter, applied to the 3D Fourier transform of the OCT tomogram (as in the transition between the lower panels of FIGS. 4(a) and 4(b)), 're-phases' components in the transverse frequency domain of the focal-plane PSF to restore constructive interference across the bandwidth. This constructive interference results in recovery of diffraction-limited resolution at the nominal focus, accompanied by increased SNR.

Derivation of the Aberration Correction Filter

The dispersion corrected SD-OCT signal, S(x,y;k), acquired through transverse scanning of the incident beam, can be written as a convolution of the (complex) system PSF, h(x,y,z;k), with the scattering potential η(x,y,z) which describes the properties of the sample that are to be imaged:

$$S(x,y;k)=\iiint h(x-x',y-y',z';k)\eta(x',y',z')dx'dy'dz'. \quad (1)$$

Due to a double-pass imaging geometry, the system PSF, h(x,y,z;k)=μ$_r$k²|P(k)|² g²(x,y,z;k), is a product of the complex incident and (identical) collection beam, g(x,y,z;k), where |P(k)|² is the optical power spectral density and μ$_r$ determines the interferometric splitting ratio. The convolution theorem can be invoked to rewrite Eqn. 1 in the transverse spatial frequency domain as $$\tilde{S}(Q_x,Q_y;k)=\int H(Q_x,Q_y,z';k)\tilde{\eta}(Q_x,Q_y,z')dz', \quad (2)$$

where the tilde () denotes the two-dimensional (2D) transverse Fourier transform, and H(Q$_x$,Q$_y$,z;k) encodes the (depth-dependent) transverse band-pass response of the effective PSF.

The axial coordinate origin z=0 is set at the nominal (aberration-free) beam focus. For the ideal case (with aberration-free beams), Eqn. (2) can be simplified using asymptotic approximations for the near and far-from-focus regime, to give the ISAM forward model $$\tilde{S}(Q_x,Q_y;k)=H(Q_x,Q_y;k)\tilde{\tilde{\eta}}(Q_x,Q_y,Q_z), \quad (3)$$

where the double tilde () denotes the 3D Fourier transform, and the filter H(Q$_x$,Q$_y$;k) encodes the axial and transverse spatial frequency response of the (ideal) system. The ISAM algorithm acts on $\tilde{S}(Q_x,Q_y;k)$, to compute a band-pass filtered version of the 3D Fourier transform of the scattering potential, resampled utilizing the relationship $Q_z=\sqrt{4k^2-Q_x^2-Q_y^2}$ and Eqn. (3).

CAO is based on computational corrections of the effects of pupil plane aberrations in the tomogram. The objective lens pupil function P(x,y) is related to the focal-plane transverse frequency response of the single-pass illumination beam via the coordinate change (x,y)=(−2πz$_f$Q$_x$/k,−2πz$_f$Q$_y$/k), resulting in $$\tilde{g}(Q_x, Q_y, 0; k) = P\left(\frac{-2\pi z_f Q_x}{k}, \frac{-2\pi z_f Q_y}{k}\right), \quad (4)$$

where z$_f$ is the (object-side) focal length of the objective lens. The beam aberration, Φ$_g$, is included in the generalized pupil function P(x,y)=P$_{ideal}$(x,y)e$^{ik\Phi_g(x,y)}$, where P$_{ideal}$(x,y) is a real Gaussian envelope. Since the ideal beam focus is the impulse response of the (single-pass) imaging system, $\tilde{g}(Q_x,Q_y,0;k)$ can be regarded as the (transverse) amplitude transfer function.

In contradistinction to hardware-based adaptive optics in which beam aberrations are corrected, CAO, in accordance with embodiments of the present invention, corrects the effects of aberrations in the system PSF, h(x,y,z;k). Eqn. (4) is used to relate pupil aberrations of the illumination beam to aberration artifacts in the system PSF. According to Eqn. (4), pupil aberrations can be corrected in the (focal-plane) transverse frequency domain of the illumination beam. For an ideal focus, all transverse spatial frequencies interfere constructively, resulting in a uniform phase response for both the single-pass illumination beam and corresponding system PSF.

Defining $\Phi_h$ as the deviation of the system focal-plane PSF from uniform transverse-frequency phase, and neglecting constant phase offsets, we obtain $$\Phi_h\left(\frac{-2\pi z_f Q_x}{k}, \frac{-2\pi z_f Q_y}{k}\right) = \arg\left\{\left[P\left(\frac{-2\pi z_f Q_x}{k}, \frac{-2\pi z_f Q_y}{k}\right) * P\left(\frac{-2\pi z_f Q_x}{k}, \frac{-2\pi z_f Q_y}{k}\right)\right]\right\} \quad (5)$$

where the convolution, indicated by *, is performed over coordinates $(Q_x, Q_y)$. It is convenient to invoke the convolution theorem, and numerically evaluate the right hand side of Eqn. 5 as a product in the spatial domain.

Generally, aberrations in the pupil result in artefacts that vary with depth and so require correction at each plane of reconstruction. Correcting these so-called space-variant aberration effects requires computations that encumber processing time. However, in some cases of interest the dominant artifacts are space-invariant, and a more efficient approach may be taken. Space-invariant contributions of aberrations can be incorporated as a linear filter, $H_A(Q_x,Q_y;k)$, and we can rewrite the model in Eqn. 3 as $$\tilde{S}_A(Q_x,Q_y;k) \approx H_A(Q_x,Q_y;k) H(Q_x,Q_y;k) \tilde{\eta}(Q_x,Q_y,Q_z), \quad (6)$$

where we only consider the phase contribution from the convolution in Eq. 5, to obtain the filter $H_A(Q_x,Q_y;k) = e^{ik\Phi_h(-2\pi z_f Q_x/k, -2\pi z_f Q_y/k)}$. The effect of this phase filter is simply inverted to obtain an aberration correction filter, $H_{AC}(Q_x,Q_y;k) = e^{-ik\Phi_h(-2\pi z_f Q_x/k, -2\pi z_f Q_y/k)}$, and the signal with ideal (diffraction-limited) resolution restored to the focal plane is given by $$\tilde{S}_{AC}(Q_x,Q_y;k) = H_{AC}(Q_x,Q_y;k) \tilde{S}_A(Q_x,Q_y;k). \quad (7)$$

Since aberrations may vary with depth into the sample, space-variant effects of aberrations can be corrected via a 2D version of the aberration correction filter, and applied to $\tilde{S}(Q_x, Q_y, z_{const})$, at a given depth $z_{const}$.

Within the scope of the present invention as claimed, the filter kernel H need not be derived using point scatterers at all, and might also be derived using any detected aberrated point spread function relative to a desired system point spread function, or, for example, by tweaking the type and strength of aberrations (or linear combination of different aberrations) that it corrects, on the basis of image metrics (such as the Rényi entropy, for example) applied to a scattering (e.g., biological) sample. The foregoing approach resembles sensor-less AO techniques described by Booth, *Wave front sensor-less adaptive optics: a model-based approach using sphere packings*, Opt. Exp., vol. 14, pp. 1339-52 (2006), Debarre et al., *Image based adaptive optics through optimisation of low spatial frequencies*, Opt Exp., vol. 15, pp. 8176-90 (2007), Debarre, et al., Image-based adaptive optics for two-photon microscopy, Opt. Lett., vol. 34, pp. 2495-97, (2009), all of which are incorporated herein by reference, where the image metrics provide feedback for determining an appropriate and optimal aberration correction filter. An advantage of the foregoing class of methods is that an aberration correction filter in CAO need not be determined at the time of imaging, and, so, is not subject to the constraints/requirements of real-time imaging. When point scatterers are used to determine the aberration correction filter, the interference signal deriving from the point scatterers may be referred to herein as a calibration interference signal.

As in the case of hardware-based AO, pupil phase aberrations of the beam, $\Phi_g$, are typically expressed as a sum of Zernike polynomials, corresponding to specific, well-known, aberrations. While in principle it may be possible to compute $\Phi_g$ from a measurement of $\Phi_h$, practically it is convenient to optimize the aberration correction filter based on the tomogram of a sample consisting of sub-resolution scatterers, or on visual inspection or image metrics applied to the sample of interest.

Figure 5:
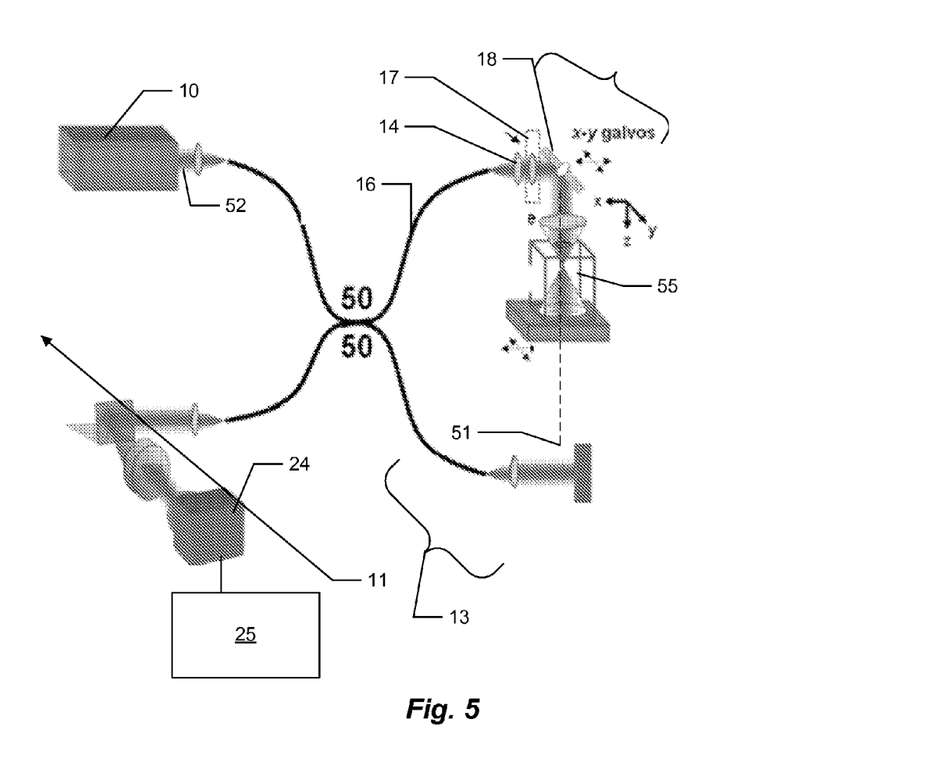
FIG. 5 is a schematic depiction of data extraction from a three-dimensional optical data medium, in accordance with embodiments of the present invention.

In accordance an alternate embodiment of the invention, now described with reference to FIG. 5, computed adaptive optics are applied to derive data encoded throughout the volume of a 3D optical medium 55. Such a medium may include a photochromic or nonlinear optical material or any material known, or discovered in the future, for distributing data throughout the volume of a material, in whatever phase of matter, that is substantially transparent to some form of electromagnetic radiation. The optical medium may be stationary or may be rotated, as an optical disk. In particular, the optical medium may comprise a DVD or Blu-Ray™-type medium. As described above, the medium is illuminated, substantially along axis 51, by broadband radiation 52. In processor 25, an aberration filter, based on point spread function derived interferometrically, as described above, is applied in order to remove aberration artifacts from one or more planes of the optical medium transverse to axis 51 as light is returned from features within the optical medium, whether by scattering or by reflection. Data encoded in a specified plane may thus be read at high rates.

In accordance with further embodiments of the invention, images may also be corrected on the basis of modified resampling schemes that are derived (theoretically or experimentally). These resampling schemes can be evaluated based on the sharpness of point like scatterers or via imaging metrics applied to the aberration corrected data.

In accordance with yet further embodiments of the invention, specially designed lenses, such axicon lenses, may be employed to overcome the steep signal roll-off with depth, as per the point described in the previous paragraph with respect to reducing the dynamic range of the measured data, and to computationally correct the data to recover an effective PSF that is a complex Gaussian, or other desired, beam function.

In preferred embodiments of the present invention, the disclosed methods for computationally correcting for aberrations in the image of a sample region obtained by interferometric synthetic aperture microscopy are implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

The foregoing results demonstrate that imaging with an astigmatic beam may advantageously provide the benefit of a more uniform depth-dependent signal than otherwise achieved. CAO may advantageously enable the replacement of complicated and expensive optical hardware components with algorithms implemented on a standard desktop computer, thereby contributing toward availability of high-resolution 3D optical interferometric tomography to a wider community of users and non-specialists.

The embodiments of the invention described herein are intended to be merely exemplary; and variations and modifications will be apparent to those skilled in the art. All such variations and modifications are intended to be within the scope of the present invention as defined in any appended claims.

We claim:

1. A method for correcting for aberrations in an image or 3D reconstruction of a sampled region obtained by broadband interferometry, the method comprising:
    a. illuminating the sampled region with a broadband source of light characterized by a beam propagation axis;
    b. acquiring an interference signal between light scattered from the sampled region and a reference beam derived from the broadband source, the interference signal acquired at a plurality of pixels in a volume spanned by wavenumber and by axes transverse to the beam propagation axis; and
    c. applying an optimization procedure to the image with respect to a specified criterion so as to obtain an aberration-corrected image of at least one plane of the sampled region.

2. A method according to claim 1, wherein the optimization procedure comprises minimizing a difference between a detected aberrated point spread function and a specified system point spread function.

3. A method according to claim 2, further comprising applying a filter function to correct the image based on the detected aberrated point spread function.

4. A method according to claim 1, wherein the optimization procedure includes extremizing a specified parameter subject to a specified model.

5. A method according to claim 4, wherein the specified parameter is a Rényi entropy.

6. A method according to claim 1, wherein the optimization procedure includes resampling based on at least one of sharpness of point-like scatterers and specified imaging metrics applied to aberration-corrected image data.

7. A method according to claim 3, further comprising:
    e. irradiating the sampled region in conjunction with irradiating a sparsely distributed plurality of point scatterers, by means of the broadband source of light;
    f. superposing scattered radiation from the plurality of point scatterers with a reference beam derived from the broadband source of light to provide a calibrating interference signal;
    g. acquiring the calibrating interference signal as a function of wavelength; and
    h. deriving the filter function on a basis of the detected aberrated point spread function relative to a desired system point spread function determined from the distributed plurality of point scatterers.

8. A method according to claim 3, further comprising solving an inverse scattering problem based upon the interference signal subject to the filter function to infer a three-dimensional structure of the sampled region.

9. A method according to claim 3, wherein the step of applying the filter function derives a plurality of aberration-corrected images in each of a plurality of en face planes.

10. A method according to claim 7, wherein the sparsely distributed plurality of point scatterers are included in the sampled region.

11. A method according to claim 7, further comprising injecting the sparsely distributed point scatterers into the sample region.

12. A method according to claim 7, wherein the sparsely distributed plurality of point scatterers are included in a phantom distinct from the sampled region.

13. A method according to claim 12, wherein the phantom is irradiated in temporal succession to the sample under substantially identical optical conditions as the sampled region.

14. A method according to claim 1, wherein the step of acquiring includes superposition of the light scattered from the sampled region with the reference beam onto a plurality of detectors.

15. A non-transitory computer readable medium for use on a computer system for correcting aberrations in an image or 3D reconstruction of a sampled region obtained by broadband interferometry, the non-transitory computer readable medium having computer readable program code thereon, the computer readable program code comprising:
    a. a computer code module for receiving an interference signal between light scattered from the sampled region as illuminated by a broadband source and a reference beam derived from the broadband source, the interference signal acquired at a plurality of pixels in a volume spanned by wavenumber and by axes transverse to a beam propagation axis of the broadband source; and
    b. a computer code module for applying an optimization procedure to the image with respect to a specified criterion so as to obtain an aberration-corrected image of at least one plane of the sampled region.

16. The non-transitory computer readable medium of claim 15, further comprising:
    c. a computer code module for deriving a filter function accounting for a detected aberrated point spread function relative to a desired system point spread function; and
    d. a computer code module for applying the filter function to obtain the aberration-corrected image of at least one plane of the sampled region.

17. A method for reading data from an optical information storage medium, the method comprising:
    a. irradiating a region of the optical information storage medium with a beam of light characterized by a broadband spectrum;
    b. superposing radiation returned from a plurality of features disposed within the optical information storage medium with a reference beam derived from the beam of light to provide an interference signal;
    c. acquiring the interference signal as a function of wavelength;

d. applying an optimization procedure to an image with respect to a specified criterion so as to obtain an aberration-corrected image of at least one plane of the region of the optical information storage medium; and
e. outputting a data value based on an optical characteristic of one feature within the region of the optical storage medium.

18. A method for reading data according to claim 17, further comprising:
f. applying to the interference signal a filter function accounting for an aberrated point spread function relative to a desired system point spread function to obtain the aberration-corrected image of a specified plane of the region; and
g. outputting a data value based on an optical characteristic of a feature within the specified plane of the region.

* * * * *